UNITED STATES PATENT OFFICE.

CORNELIUS E. HAYNES, OF BOSTON, MASSACHUSETTS, ASSIGNOR TO AMOS L. WOOD, TRUSTEE, OF SAME PLACE.

COMPOSITION FOR RENDERING LEATHER, CLOTH, &c., WATER-PROOF.

SPECIFICATION forming part of Letters Patent No. 374,675, dated December 13, 1887.

Application filed April 13, 1887. Serial No. 234,698. (No specimens.)

*To all whom it may concern:*

Be it known that I, CORNELIUS E. HAYNES, of Boston, in the county of Suffolk and State of Massachusetts, have invented a new and useful Improvement in Compositions of Matter for Rendering Leather, Leather-Board, Cloth, &c., Oil and Water Repellent, of which the following is a specification.

My composition consists of the following ingredients, combined in the proportions stated: silicate of soda, eight pounds; rosin, eight pounds; alum, four pounds; carbonate of potash, two pounds; fish glue, eight pounds. Granulate and dissolve in thirty gallons of hot water; then add one-quarter of a pound of sulphate of zinc in the form of a saturated solution in water; and, finally, add one-quarter pound of sulphate of copper in the form of a saturated solution in water. Stir the whole thoroughly, and it will be ready for use.

The compound is to be used for rendering leather, leather-board, or cloth goods repellent for oil or water, and may be applied by using a sponge or brush.

What I claim as my invention, and desire to secure by Letters Patent of the United States, is—

The herein-described composition of matter to be used for rendering leather, leather-board, paper or cloth goods, &c., repellent for oil and water, consisting of water, silicate of soda, rosin, alum, potash, fish glue, sulphate of zinc, and sulphate of copper, in the proportions specified.

In testimony whereof I have signed my name to this specification, in the presence of two subscribing witnesses, on this 19th day of March, A. D. 1887.

CORNELIUS E. HAYNES.

Witnesses:
FRANK G. PARKER,
AMOS L. WOOD.